United States Patent
Brahim et al.

(10) Patent No.: US 8,821,976 B2
(45) Date of Patent: Sep. 2, 2014

(54) METHOD FOR ELABORATING CARBON NANOTUBES ON A SUBSTRATE

(75) Inventors: Cyrine Brahim, Paris (FR); Hicham Maskrot, Montlhery (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/505,717

(22) PCT Filed: Nov. 10, 2010

(86) PCT No.: PCT/EP2010/067178
§ 371 (c)(1),
(2), (4) Date: May 29, 2012

(87) PCT Pub. No.: WO2011/058038
PCT Pub. Date: May 19, 2011

(65) Prior Publication Data
US 2012/0237680 A1 Sep. 20, 2012

(30) Foreign Application Priority Data

Nov. 13, 2009 (FR) .................................. 09 58012

(51) Int. Cl.
| | |
|---|---|
| C23C 16/26 | (2006.01) |
| C23C 16/40 | (2006.01) |
| B82Y 30/00 | (2011.01) |
| C01B 31/02 | (2006.01) |
| B82Y 40/00 | (2011.01) |

(52) U.S. Cl.
CPC ............ C01B 31/0233 (2013.01); B82Y 30/00 (2013.01); B82Y 40/00 (2013.01)
USPC ................. 427/249.1; 427/249.4; 427/255.31

(58) Field of Classification Search
USPC ............ 427/248, 249.1, 249.4, 248.1, 255.31
See application file for complete search history.

(56) References Cited

U.S. PATENT DOCUMENTS

| | | | | |
|---|---|---|---|---|
| 8,119,021 | B2 * | 2/2012 | Gogotsi et al. | 252/62.51 R |
| 2003/0116503 | A1 * | 6/2003 | Wang et al. | 210/660 |
| 2005/0053542 | A1 * | 3/2005 | Harutyunyan | 423/447.3 |
| 2005/0287064 | A1 * | 12/2005 | Mayne et al. | 423/445 B |
| 2008/0031804 | A1 * | 2/2008 | Taki et al. | 423/447.7 |
| 2008/0182027 | A1 * | 7/2008 | Vasenkov | 427/450 |
| 2009/0004091 | A1 * | 1/2009 | Kang et al. | 423/384 |
| 2009/0111282 | A1 * | 4/2009 | Ward et al. | 438/768 |
| 2010/0047522 | A1 * | 2/2010 | Sivarajan et al. | 428/143 |
| 2010/0193350 | A1 * | 8/2010 | Liu et al. | 204/192.15 |
| 2011/0038785 | A1 * | 2/2011 | Goto et al. | 423/447.1 |
| 2012/0171107 | A1 * | 7/2012 | Chen et al. | 423/447.3 |
| 2012/0219490 | A1 * | 8/2012 | Noda et al. | 423/447.3 |

FOREIGN PATENT DOCUMENTS

| | | |
|---|---|---|
| EP | 1 199 379 A1 | 4/2002 |
| FR | 2 927 619 A1 | 8/2009 |
| JP | 2006-62953 * | 3/2006 |

OTHER PUBLICATIONS

Poulsen, P.R., et al., "Single-Wall Carbon Nanotube Devices Prepared by Chemical Vapor Deposition". AIP Conf. Proc. 544, 504 (2000), pp. 1-4.*
Tang, Y.H., et al., "Carbon monoxide-assisted growth of carbon nanotubes". Chemical Physics Letters 342 (2001) pp. 259-264.*
Kuang, Qin, et al., "Controllable fabrication of SnO2-coated multiwalled carbon nanotubes by chemical vapor deposition". Carbon 44 (2006) 1166-1172.*
Korneva, Guzeliya, et al., "Carbon Nanotubes Loaded with Magnetic Particles". Nano Letters 2005, vol. 5 No. 5, pp. 879-884.*
Yuan, Liming, et al., "Ethylene flame synthesis of well-aligned multi-walled carbon nanotubes". Chemical Physics Letters 346 (2001), 23-28.*
Karlsson, Hanna L., et al., "Copper Oxide Nanoparticles are Highly Toxic: A Comparision between Metal Oxide Nanoparticles and Carbon Nanotubes". Chem. Res. Toxicol. 2008, vol. 21, No. 9, 1726-1732.*
Korneva, Guzeliya, et al., "Carbon Nanotubes Loaded with Magnetic Particles". Nano Letters 2005 vol. 5, No. 5, pp. 879-884.*
Jiang, Yingqi, et al., "Uniformly Embedded Metal Oxide Nanoparticles in Vertically Aligned Carbon Nanotube Forests as Pseudocapacitor Electrodes for Enhanced Energy Storage". Nano Lett. 2013, 13, 3524-3530.*
Qian, et al., "Hierarchiacal composites reinforced with carbon nanotube grafted fibers: The potential assessed at the single fiber level", Chemistry of Materials, vol. 20, No. 5, dated Feb. 9, 2009, pp. 1862-1869, XP002600708.
Tagaki, et al., "Carbon Nanotube Growth from Semiconductor Nanoparticles", Nano Letters, ACS, Washington, DC, US LNKD-DOI:10.1021/NL0708011, vol. 7, No. 8, Jul. 19, 2007, pp. 2272-2275, XP002497374.
Fujii, et al., "Purification of orientation carbon nanotube film used as electron source of cold cathode, involves pasting functional sheet on surface of orientation film, and removing impurity from film surface by peeling functional sheet", WPI/THOMSON, vol. 2005, No. 8, Jan. 6, 2005, XP002499930.
Fujii, et al., "Production of aligned carbon nanotube film used in, e.g. electron emitters, by preparing sol-gel method porous carrier having fine pores, and decomposing carbon compound with catalyst loaded on the carrier", WPI/ THOMSON, vol. 2004, No. 13, Oct. 1, 2003, XP002499931.
International Search Report issued on Mar. 2, 2011 for International Patent Application No. PCT/EP2010/067178.

* cited by examiner

*Primary Examiner* — Bret Chen
(74) *Attorney, Agent, or Firm* — Knobbe, Martens, Olson & Bear, LLP

(57) ABSTRACT

A method for elaborating carbon nanotubes on a substrate is provided. The method may comprise a step for growing on the substrate the nanotubes by chemical vapor deposition by having a stream comprising a carbon source, a precursor source of an oxide compound and, optionally a catalyst source, pass over the substrate.

15 Claims, 3 Drawing Sheets

METHOD FOR ELABORATING CARBON NANOTUBES ON A SUBSTRATE

RELATED APPLICATIONS

This application is a U.S. National Phase of International Application No. PCT/EP2010/067178, filed Nov. 10, 2010, designating the U.S., and published in French as WO 2011/058038 on May 19, 2011 which claims the benefit of French Patent Application No. 09 58012 filed Nov. 13, 2009.

TECHNICAL FIELD

The present invention relates to a method for elaborating carbon nanotubes on a substrate, in particular, a fibrous substrate consisting of an entanglement of carbon or carbide fibers, the growing of the nanotubes being achieved without requiring any preliminary treatment of the substrate.

The elaboration method according to the invention gives the possibility of obtaining carbon nanotubes which are firmly attached to the substrate on which they were elaborated, thereby leading to modified substrates having better mechanical and electrical properties, because of the excellent properties of nanotubes in terms of mechanical strength, electrical conductivity and thermal stability. Nanotubes may thereby be considered as excellent reinforcements for substrates, such as fibrous substrates.

BACKGROUND

Methods for synthesizing carbon nanotubes on a substrate have been the subject of many applications in the prior art by means of the chemical vapor deposition technique (known under the abbreviation CVD for "Chemical Vapor Deposition"), based on decomposition of a carbon source (or a carbon precursor), for example a gas source (such as ethylene, acetylene) or a liquid source (such as toluene, ethanol) in the presence of a metal catalyst, the growing of carbon nanotubes on the substrate requiring a preliminary treatment of the substrate so as to improve interfacial adhesion between the substrate and the nanotubes.

The preliminary treatment of the substrate may consist in a heat treatment under suitable conditions.

Thus, document [1] (Thostenson et al., *Journal of Applied Physics*, Volume 91, Number 9, 2002, p. 6034-6037) describes a method for growing carbon nanotubes on a carbon fiber substrate respectively comprising a step for preliminary treatment of the substrate by heating the latter to 700° C. in vacuo, a step for depositing on this substrate a catalyst layer by magnetron spraying and finally a step for growing carbon nanotubes by the passing of an acetylene $C_2H_2$ stream.

Other authors have treated the substrate with chemical methods before growing carbon nanotubes.

Thus, document [2] (Sager et al., Composites Science and Technology 69 (2009), p. 898-904) describes, inter alia, a method for growing carbon nanotubes on a carbon fiber substrate, in which the substrate is treated with an alcoholic solution comprising magnesium sulphate $MgSO_4$, before the passing of a flow comprising a carbon source (xylene) and a catalyst source (ferrocene) at 800° C. for 30 minutes.

Document [3] (Qian et al., Chem. Mater. 2008, 20, p. 1862-1869), as for it, proposes the growing of carbon nanotubes on a carbon fiber substrate, which has been treated beforehand by subjecting it to acid oxidation for 5 hours (with a 65% nitric acid $HNO_3$ solution) followed by a basic washing (with 0.05M soda NaOH) for 24 hours.

Finally, the authors of document [4] (FR 2927619) before growing the carbon nanotubes on a fibrous substrate proceeded with depositing a ceramic sub-layer on said substrate, always with the idea of improving interfacial adhesion between the substrate and the carbon nanotubes and growth of the latter.

Thus, from most modes of application of the prior art, the requirement for proceeding with a surface treatment of the substrate emerges notably, when said substrate consists in carbon fibers, before proceeding with the growing on the latter of carbon nanotubes by chemical vapor deposition.

The inventors therefore set the goal of proposing a method for elaborating carbon nanotubes on a substrate without having to resort to a step for surface treatment of said substrate before growing said nanotubes, as this is the case of the applications of the prior art.

DESCRIPTION OF CERTAIN INVENTIVE ASPECTS

In order to achieve the aforementioned goal, the inventors surprisingly discovered that by adding a specific additive in addition to the carbon source during the step for growing carbon nanotubes by chemical vapor deposition, it is possible to obtain growth of carbon nanotubes on substrates of diverse nature and shape, said nanotubes having excellent interfacial adhesion with the substrate, without it being necessary to treat the latter beforehand.

Thus, the invention according to a first object relates to a method for elaborating carbon nanotubes on a substrate comprising a step for growing on said substrate said nanotubes by chemical vapor deposition by having a flow comprising a carbon source, a precursor source of an oxide compound and, optionally a catalyst source pass over said substrate.

The innovative idea of the inventors essentially lies in the addition of a precursor source of an oxide compound during the growth step by chemical vapor deposition, this source having a dual benefit of:
  allowing good adhesion of the carbon nanotubes on a wide variety of substrates, without the latter needing to be subject to a specific preliminary treatment;
  concomitantly allowing reinforcement of the carbon nanotubes by including into the latter oxide particles, for example oxide nanoparticles, stemming from the precursor source of oxide compound.

Furthermore, without pre-treatment of the substrate, it is possible to access in a single step to three-dimensional growth of carbon nanotubes reinforced with oxide particles.

The present invention applies to a large number of substrates which may have diverse geometrical shapes, and notably applies to planar substrates, substrates appearing as a foam, substrates having at the surface lithographic patterns or further fibrous substrates.

From a chemical point of view, the substrate may be selected for example from quartz substrate, silicone substrate, metal oxide substrate, such as of $Al_2O_3$, $Y_2O_3$, MgO and $ZrO_2$ and from fibrous substrates comprising carbon or carbide fibers.

In particular, the method most particularly applies to fibrous substrates comprising carbon or carbide fibers.

The substrate may, prior to the growth step, be provided with a catalyst layer (i.e. a catalyst capable of catalyzing the growth reaction of carbon nanotubes), in which case the aforementioned flow may not contain any catalyst source as defined above.

The growth step is carried out as mentioned above by chemical vapor deposition.

It is specified that by chemical vapor deposition is meant conventionally a growth technique based on the decomposition by pyrolysis of the carbon source and of the precursor source of an oxide compound, in order to form carbon nanotubes further comprising oxide particles, and optionally of the catalyst source, in order to form particles of catalysts which will catalyze the growth reaction of carbon nanotubes.

In the sense of the invention, by a precursor source of an oxide compound is conventionally meant in the foregoing and in the following, a compound, the decomposition of which by pyrolysis leads to the formation of an oxide compound, which may be selected from $SiO_2$, $Al_2O_3$, $ZrO_2$ and $TiO_2$, said source may be selected from organometallic compounds and metal salts.

As an example of a precursor source of an oxide compound, mention may be made as organometallic compounds, metal alkoxides, such as silicon alkoxides such as tetraethyl orthosilicate $Si(OC_2H_5)_4$ or titanium alkoxides such as titanium tetraisopropoxide $Ti[OCH(CH_3)_2]_4$.

In the sense of the invention, by a carbon source is conventionally meant in the foregoing and in the following, one or several carbonaceous organic compounds precursors of the carbon forming the nanotubes, the decomposition of which by pyrolysis leads the formation of carbon nanotubes, which compounds may be carbonaceous organic compounds selected from aliphatic hydrocarbons or aromatic hydrocarbons.

As examples of aliphatic hydrocarbons, mention may be made of alkanes, alkenes, and alkynes, such as for example propane, ethylene, acetylene and mixtures thereof.

As examples of aromatic hydrocarbons, mention may be made of benzene, toluene, xylene.

According to the invention, an aromatic hydrocarbon such as toluene is preferentially used as a source of carbon.

In the sense of the invention, by catalyst source is conventionally meant, in the foregoing and in the following, one or several compounds comprising carbon, hydrogen, optionally nitrogen and oxygen and at least one metal element, the decomposition of which by pyrolysis leads to the formation of catalyst particles, which metal element may be selected from a transition metal (such as Fe, Co, Ti or Ni) or a noble metal (such as Pd, Ru, Pt), which will allow catalysis of the growth reaction of the carbon nanotubes.

As examples of a catalyst source, mention may be made of organometallic compounds, such as metallocenes, like ferrocenes, nickelocenes, cobaltocenes, ruthenocenes, or further phthalocyanines, such as iron or nickel phthalocyanines. Mention may also be made of metal salts, such as metal nitrates, acetates or halides.

The concentration of said precursor source(s) of an oxide compound may generally range from 5 to 15% by mass based on the total mass consisting of the carbon source, of the precursor source of an oxide compound and optionally of the catalyst source.

The growth step is conventionally achieved in a chemical vapor deposition reactor.

The flow comprising a carbon source, a precursor source of an oxide compound and optionally a catalyst source, advantageously appears as an aerosol, i.e. a suspension in a gas medium of liquid particles consisting of the carbon source, of the precursor compound and optionally of the catalyst source, said gas medium may be formed by a carrier gas which allows said particles to be conveyed.

The carrier gas may be a neutral gas, such as argon, helium, nitrogen $N_2$ and mixtures thereof.

The growth step is conventionally achieved at a temperature ranging from 700 to 1,100° C., for example from 800 to 900° C., for a duration which may range from 50 to 60 minutes.

Advantageously, the growth step is achieved under a neutral gas atmosphere, such as the gases mentioned above.

Particular exemplary embodiments of the method of the invention are those for which:
  the substrate is a carbon fiber substrate, the carbon source is toluene, the precursor source of an oxide compound is tetraethyl orthosilicate $Si(OC_2H_5)_4$ and the catalyst source is ferrocene; or
  the substrate is a silicon substrate, the carbon source is toluene, the precursor source of an oxide compound is titanium tetraisopropoxide $Ti[OCH(CH_3)_2]_4$ and the catalyst source is ferrocene.

The aerosol may be obtained from a liquid solution comprising the carbon source, the precursor source of an oxide compound and optionally the catalyst source, from the following operations:
  by introducing the aforementioned liquid solution into an aerosol generator including a piezoelectric ceramic cell, the vibration of which allows generation of the aerosol; or
  by having said liquid solution pass into an atomization nozzle, which reduces said solution into finely divided liquid particles; or
  by direct liquid injection of said solution, this injection technique being known under the abbreviation of DLI, this technique consisting of introducing into the physical vapor deposition reactor, said solution by periodically injecting droplets thereof, driven by a carrier gas; or
  by flash evaporation of said solution.

The method of the invention may be applied in a device comprising the following elements:
  a chemical vapor deposition reactor, comprising an enclosure intended to receive said substrate and a tubular oven surrounding said enclosure;
  a tank containing said carbon source, said precursor source of an oxide compound and optionally said catalyst source; and
  an element generating an aerosol, such as a piezoelectric ceramic cell contained in said tank;
  said tank being connected to the aforementioned reactor.

Said device may comprise, downstream from the reactor, an enclosure for trapping gases formed in said reactor.

The device may further comprise one or several valves, the opening of which may allow introduction of a carrier gas.

An operating procedure for applying the method of the invention with the device as defined above, may take place in the following way:
  the tank comprising a piezoelectric ceramic cell is filled with a liquid solution comprising the carbon source, the precursor source of an oxide compound and optionally the catalyst source;
  the tubular oven is then subject to a program for raising the temperature in order to attain the desired temperature;
  as soon as the oven has attained the desired temperature, the piezoelectric ceramic cell is set into vibration so as to generate the aerosol from the liquid solution;
  the aerosol formed is driven towards the enclosure of the chemical vapor deposition reactor containing the substrate, by means of a carrier gas upon opening a suitable valve.

Thus, as a summary, the innovative method of the invention gives the possibility of obtaining direct fast uniform and multi-dimensional growth of carbon nanotubes reinforced with oxide particles on diverse shapes and natures of substrates, with good interfacial adhesion between the substrate and the carbon nanotubes, without it being necessary to treat the surface of said substrate before growing on the latter said carbon nanotubes.

The method of the invention may find its application in a wide variety of fields.

It may be applied for reinforcing substrates in terms of mechanical and electrical properties, notably for fibrous substrates.

Other features and advantages will become better apparent upon reading the additional description which follows, which relates to exemplary embodiments of the method of the invention.

Of course, the following examples are only given as an illustration of the invention and by no means form a limitation of its object.

DETAILED DISCUSSION OF CERTAIN ILLUSTRATIVE EMBODIMENTS

Figure 1:
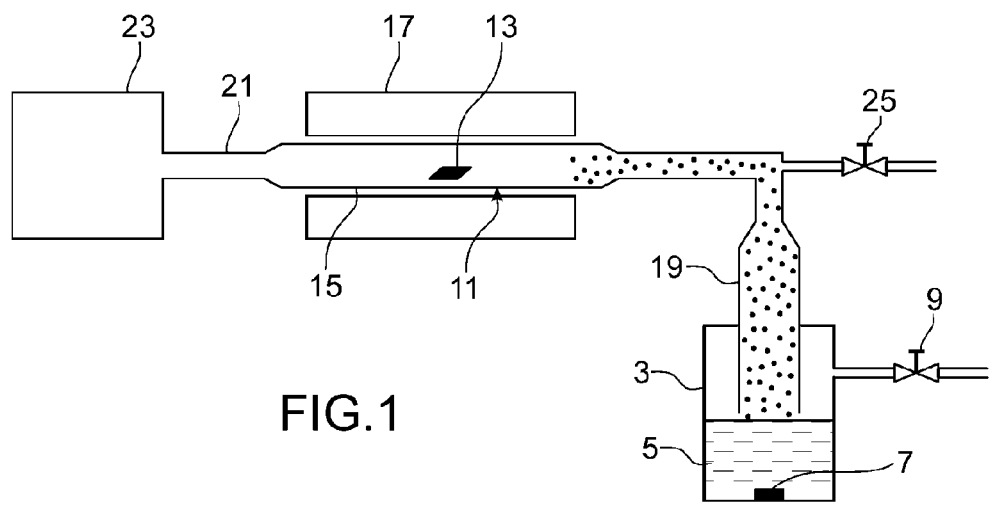
FIG. 1 illustrates a side sectional view of the device used for applying the method of the invention according to the embodiments of Examples 1 and 2 discussed below.

Reference is first of all made to FIG. 1, which illustrates a side view of the device, which was used for applying the examples appearing below.

The device first of all comprises an aerosol generator 3 consisting in a tank, for example in stainless steel, comprising a liquid mixture 5, comprising:
  the carbon source;
  the precursor source of an oxide compound; and
  the catalyst source.

A circular piezoelectric ceramic part 7 with a diameter of 40 mm allowing generation of the aerosol from the liquid covering it, is placed in the lower portion of the generator. A valve 9 placed in the upper portion of the generator allows the latter to be supplied with carrier gas, such as argon, which allows the formed aerosol to be conveyed.

The device also comprises a quartz reactor 11 intended to receive the substrate 13 on which the carbon nanotubes are intended to grow.

More specifically, the reactor comprises a middle portion 15, which receives the substrate 13 and which is surrounded by a tubular oven 17 with a diameter of 50 mm and a length of 550 mm and a first extender tube 19 plunging into the generator 3 intended to convey the aerosol of the generator towards the middle portion of the reactor and a second extender tube 21 connecting the middle portion to a system for trapping reaction gases 23. A valve 25 is connected to the first extender tube, which is intended to provide carrier gas if need be.

Example 1

This example illustrates the application of the method of the invention with a substrate, which is a fibrous substrate in carbon fibers.

The solution placed in the tank of the aerosol generator comprises 400 ml of toluene, 5% by mass of ferrocene based on the total mass of the solution, and 5% by mass of tetraethyl orthosilicate $Si(OC_2H_5)_4$.

The aforementioned substrate, of dimensions $10*10$ mm$^2$, is introduced into the middle portion 15 of the reactor 11 without having been subject to preliminary treatment. The three portions of the device 3, 15 and 23 are then connected and the whole of the system is subject to degassing under an argon flow of 0.5 L/min (by opening of the valves 9 and 25) for 30 minutes. The oven is then started so that the temperature increases by 14° C./min until the synthesis temperature (850° C.) is reached under an argon flow of 0.5 L/min (opening of the valves 9 and 25). When the temperature is attained (by monitoring with a thermocouple placed at the substrate), the circular piezoelectric ceramic part 7 of the aerosol generator 3 is actuated in order to generate an aerosol from the aforementioned solution. The vibration frequency of the ceramic is 800 MHz, a value for which the size of the generated droplets is from 6 to 8 μm.

The aerosol is driven towards the substrate 13 in the middle portion 15 of the quartz reactor 11 by an argon flow of 0.8 L/min (by opening the valve 9). The synthesis period is 15 minutes. At the end of this period, the device is cooled by stopping the oven, followed by the passing of an argon flow at a rate of 3 L/min (by opening the valve 25).

Figure 2:
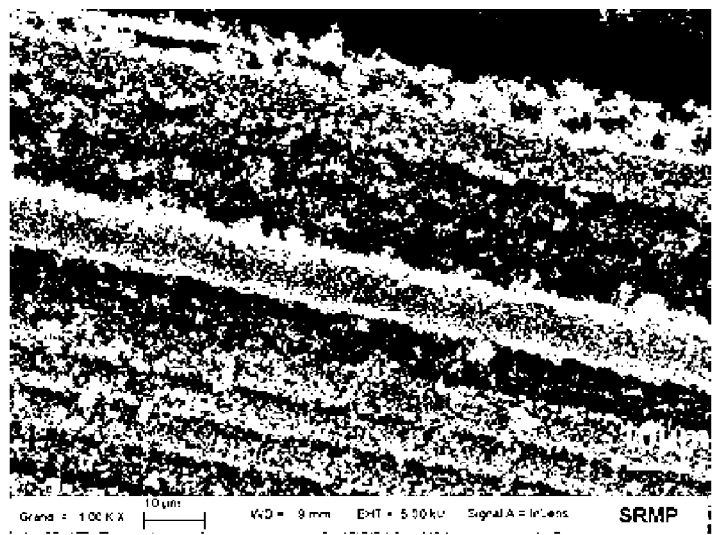
FIGS. 2, 3, and 4 illustrate micrographs obtained by scanning electron microscopy of the sample obtained in example 1.
Figure 3:
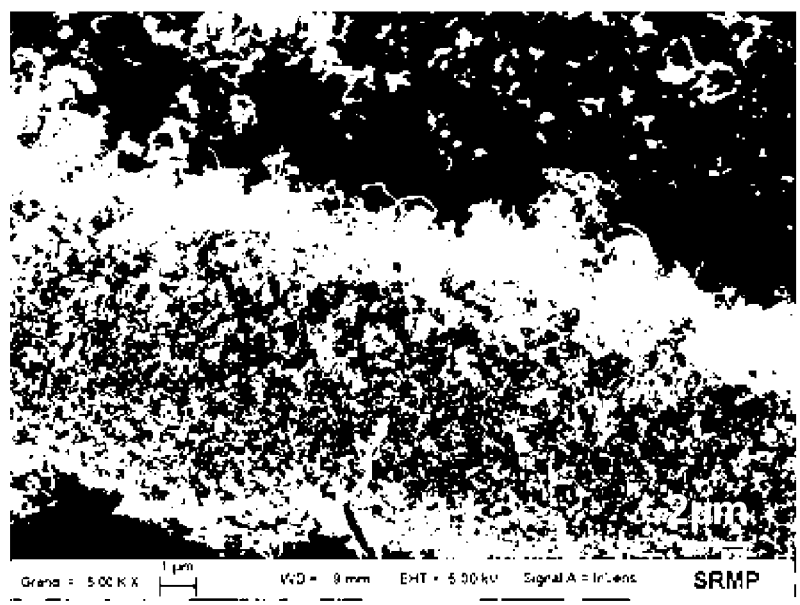
Figure 4:
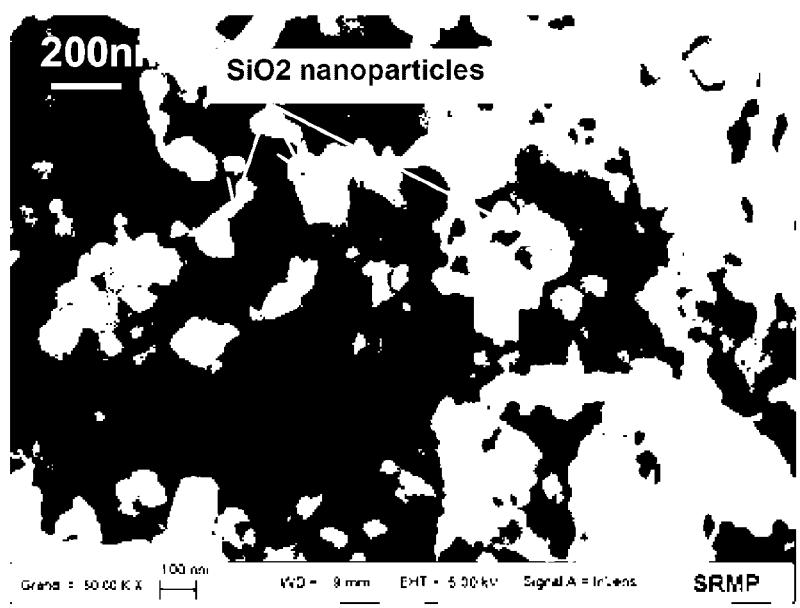

FIGS. 2, 3, and 4 illustrate micrographs obtained at different enlargements (the white lines illustrated in FIGS. 2, 3 and 4 respectively illustrating a size of 10 μm, of 2 μm and of 200 nm) by scanning electron microscopy of the sample obtained from the solution comprising 5% of tetraethyl orthosilicate, which show carbon nanotubes at the surface of the fibers and, in particular in FIG. 4, the fact that the carbon nanotubes include silica nanoparticles $SiO_2$ indicated by three arrows in FIG. 4.

Example 2

This example illustrates the application of the method of the invention with a substrate which is a silicon substrate.

The solution placed in the tank of the aerosol generator comprises 400 ml of toluene, 5% by mass of ferrocene based on the total mass of the solution and 5% by mass of titanium tetraisopropoxide $Ti[OCH(CH_3)_2]_4$ (for the first test), 10% by mass of titanium tetraisopropoxide $Ti[OCH(CH_3)_2]_4$ (for the second test), or 15% by mass of titanium tetraisopropoxide $Ti[OCH(CH_3)_2]_4$ (for the third test).

The aforementioned substrate with dimensions of $10*10$ mm$^2$, is introduced into the middle portion 15 of the reactor 11 without having been subject to preliminary treatment. The three portions of the device 3, 15 and 23 are then connected and the whole of the system is subject to degassing under a flow of argon of 0.5 L/min (by opening valves 9 and 25) for 30 minutes. The oven is then started so that the temperature increases by 14° C./min until it attains the synthesis temperature (850° C.) under a flow of argon of 0.5 L/min (opening of the valves 9 and 25). When the temperature is attained (by monitoring it with a thermocouple placed at the substrate), the circular piezoelectric ceramic part 7 of the aerosol generator 3 is actuated in order to generate an aerosol from the aforementioned solution. The vibration frequency of the ceramic is 800 MHz, a value for which the size of the generated droplets is from 6 to 8 μm.

The aerosol is driven towards the substrate 13 in the middle portion 15 of the quartz reactor 11 by an argon flow of 0.8 L/min (by opening valve 9). The synthesis period is 15 minutes. At the end of this period, the device is cooled by stopping the oven followed by passing an argon flow at a rate of 3 L/min (by opening the valve 25).

Figure 5:
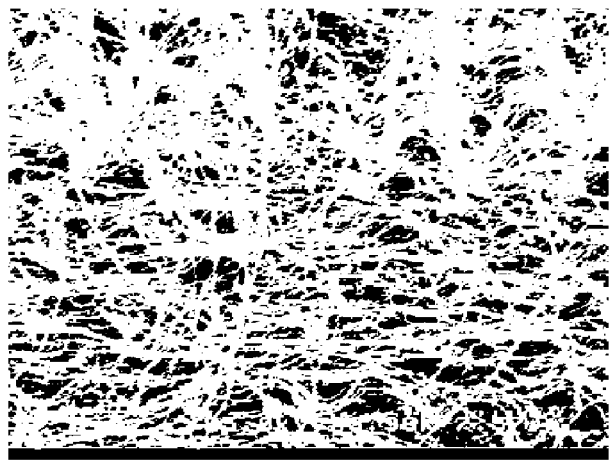
FIGS. 5, 6 and 7 illustrate micrographs obtained by scanning electron microscopy of the sample obtained in example 2.
Figure 6:
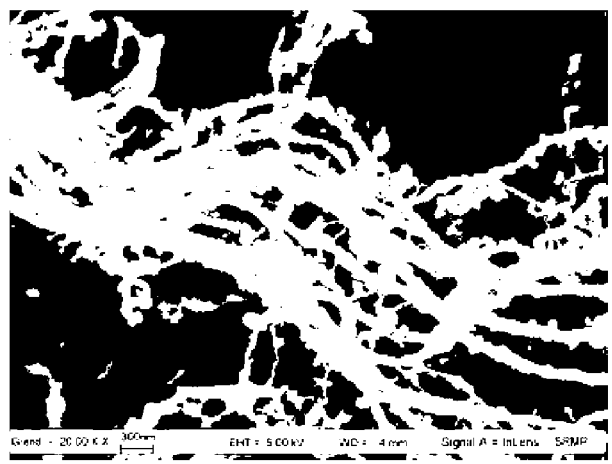
Figure 7:
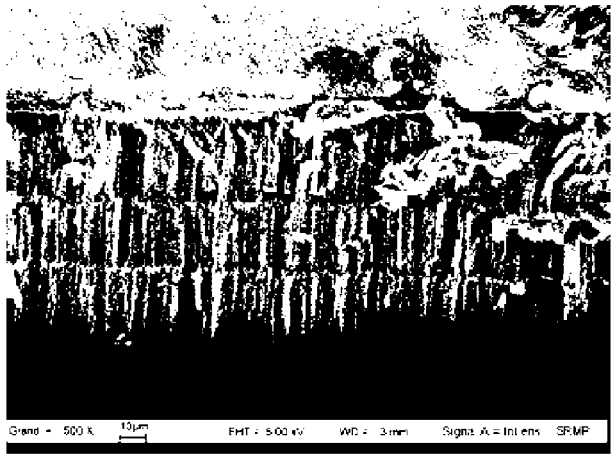

FIGS. 5, 6 and 7 represent micrographs obtained by scanning electron microscopy of the samples obtained during the first test, the second test and the third test, respectively, notably showing for the third test, carbon nanotubes reinforced with titanium oxide $TiO_2$ nanoparticles arranged in the form of several layers.

BIBLIOGRAPHIC REFERENCES

[1] Thostenson et al., Journal of Applied Physics, Volume 91, Number 9, 2002, p. 6034-6037;
[2] Sager et al., Composites Science and Technology 69 (2009), p. 898-904;
[3] Qian et al., Chem. Mater. 2008, 20, p. 1862-1869
[4] FR 2927619

What is claimed is:

1. A method for elaborating carbon nanotubes on a substrate comprising:
   growing said nanotubes on said substrate by chemical vapor deposition by having a flow comprising a carbon source, a precursor source of an oxide compound and, optionally a catalyst source, pass over said substrate; and concomitantly including oxide particles into the carbon nanotubes,
   wherein said nanotubes comprise inclusions of the oxide particles.

2. The method according to claim 1, wherein the carbon source is a carbonaceous organic compound selected from the group consisting of aliphatic hydrocarbons and aromatic hydrocarbons.

3. The method according to claim 2, wherein the aromatic hydrocarbon is selected from the group consisting of benzene, xylene and toluene.

4. The method according to claim 2, wherein the aromatic hydrocarbon is toluene.

5. The method according to claim 1, wherein the precursor source of an oxide compound is selected from the group consisting of organometallic compounds and metal salts.

6. The method according to claim 5, wherein said organometallic compounds are metal alkoxides.

7. The method according to claim 5, wherein the metal alkoxides are silicon alkoxides or titanium alkoxides.

8. The method according to claim 1, wherein the catalyst source is a compound comprising carbon, hydrogen, optionally nitrogen and oxygen, and at least one metal element.

9. The method according to claim 8, wherein the catalyst source is an organometallic compound of a metallocene type.

10. The method according to claim 1, wherein the flow appears as an aerosol consisting of a suspension in a gas medium of liquid particles consisting of the carbon source, of the precursor source of an oxide compound and optionally of the catalyst source.

11. The method according to claim 1, wherein said growing is carried out at a temperature ranging from 700 to 1,100° C. for a duration which may range from 5 to 60 minutes.

12. The method according to claim 1, wherein the substrate is selected from the group consisting of quartz substrates, silicon substrates, metal oxide substrates and fibrous substrates comprising carbon or carbide fibers.

13. The method according to claim 1, wherein the substrate is a fibrous substrate comprising carbon on carbide fibers.

14. The method according to claim 1, wherein the substrate is a substrate in carbon fibers, the carbon source is toluene, the precursor source of an oxide compound is tetraethyl orthosilicate $Si(OC_2H_5)_4$ and the catalyst source is ferrocene.

15. The method according to claim 1, wherein the substrate is a silicon substrate, the carbon source is toluene, the precursor source of an oxide compound is titanium tetraisopropoxide $Ti[OCH(CH_3)_2]_4$ and the catalyst source is ferrocene.

* * * * *